(12) United States Patent
Wells et al.

(10) Patent No.: US 12,127,527 B2
(45) Date of Patent: Oct. 29, 2024

(54) SYSTEM FOR MONITORING AND DISPLAYING STATUS OF PROCESSING A DAIRY PRODUCT

(71) Applicant: TZero Research & Development LLC, Duncansville, PA (US)

(72) Inventors: Stephen M. Wells, State College, PA (US); Nicholas A. Wells, State College, PA (US); Eli M. Hughes, State College, PA (US)

(73) Assignee: TZero Research & Development LLC, State College, PA (US)

( * ) Notice: Subject to any disclaimer, the term of this patent is extended or adjusted under 35 U.S.C. 154(b) by 420 days.

(21) Appl. No.: 17/662,443

(22) Filed: May 9, 2022

(65) Prior Publication Data

US 2022/0264837 A1    Aug. 25, 2022

Related U.S. Application Data

(63) Continuation-in-part of application No. 16/810,943, filed on Mar. 6, 2020, now Pat. No. 11,326,996.

(60) Provisional application No. 62/818,926, filed on Mar. 15, 2019.

(51) Int. Cl.
    *A01J 25/06*     (2006.01)
    *A23C 19/06*     (2006.01)
    *G01N 29/07*     (2006.01)

(52) U.S. Cl.
    CPC .............. *A01J 25/06* (2013.01); *A23C 19/06* (2013.01); *G01N 29/07* (2013.01); *G01N 2291/02818* (2013.01)

(58) Field of Classification Search
    CPC .......... A01J 25/06; A23C 19/06; A23C 19/00; G01N 29/07; G01N 2291/02818; G01N 2291/02466; G01N 2291/0251; G01N 2291/02827; G01N 2291/045; G01N 29/024
    See application file for complete search history.

(56) References Cited

U.S. PATENT DOCUMENTS

| 2,283,750 A | 5/1942 | Mikelson |
| 4,119,950 A | 10/1978 | Redding |
| 4,380,167 A | 4/1983 | Longini |

(Continued)

OTHER PUBLICATIONS

Sundaram Gunasekaran and Chyung Ay, "Milk Coagulation Cut-Time Determination Using Ultrasonics", 1996, Journal of Food Process Engineering, vol. 19, pp. 63-73 (Year: 1996).*

(Continued)

*Primary Examiner* — Peter J Macchiarolo
*Assistant Examiner* — John M Royston
(74) *Attorney, Agent, or Firm* — Fox Rothschild LLP

(57) ABSTRACT

Systems and methods for monitoring a cheesemaking process, and for identifying certain stages of the process, are disclosed. The system includes a sonic sensor, along with a processor that will receive, from the sonic sensor, a signal that is indicative of a speed of sound in a material that is being processed in the cheesemaking process. The processor will use the speed of sound to identify a cut point in the cheesemaking process. The processor will generate a signal when the cut point is reached. Optionally, before this happens the processor also may use the speed of sound to identify a flocculation point in the cheesemaking process.

20 Claims, 5 Drawing Sheets

(56) References Cited

U.S. PATENT DOCUMENTS

| | | | |
|---|---|---|---|
| 4,663,977 | A | 5/1987 | Vander Heyden |
| 4,763,513 | A | 8/1988 | Zacharias |
| 4,959,228 | A | 9/1990 | Skrgatic et al. |
| 5,172,193 | A * | 12/1992 | Payne ................. G01N 21/4738 356/448 |
| 6,343,511 | B1 | 2/2002 | Lynnworth et al. |
| 6,640,626 | B2 | 11/2003 | Saikalis et al. |
| 2002/0111568 | A1 | 8/2002 | Bukshpan |
| 2004/0050140 | A1 | 3/2004 | Palmer et al. |
| 2005/0006985 | A1 | 1/2005 | Nguyen |
| 2011/0185868 | A1 * | 8/2011 | Schmidt ................. B26D 5/007 378/54 |
| 2014/0250986 | A1 | 9/2014 | Reimer et al. |
| 2016/0041024 | A1 | 2/2016 | Reimer et al. |
| 2016/0252440 | A1 | 9/2016 | Wright et al. |
| 2016/0326866 | A1 | 11/2016 | Swett |
| 2018/0072972 | A1 | 3/2018 | Shin et al. |

OTHER PUBLICATIONS

Sundaram Gunasekaran and Chyung Ay, Milk coagulation cut-time determination using ultrasonics, Journal of Food Process Engineering, vol. 19, pp. 63-73.

M. Derra et al., Estimation of coagulation time in cheese manufacture using an ultrasonic pulse-echo technique, Journal of Food Engineering, vol. 216, pp. 65-71, 2018.

* cited by examiner

SYSTEM FOR MONITORING AND DISPLAYING STATUS OF PROCESSING A DAIRY PRODUCT

RELATED APPLICATIONS AND CLAIM OF PRIORITY

This patent document claims priority to, and is a continuation-in-part of, U.S. patent application Ser. No. 16/810,943, filed Mar. 6, 2020, which in turn claims priority to U.S. Provisional Patent Application No. 62/818,926, filed Mar. 15, 2019. The disclosures of each priority application are fully incorporated into this document by reference.

BACKGROUND

The measurement of fluid characteristics in static and dynamic environments is important in many industrial processes. For example, when brewing beer or making another fermented beverage, or when making dairy products such as cheese or yogurt, it is desirable to monitor the processing activity to ensure that it is progressing at an expected rate. If the processing of the fluid (i.e., fermentation or coagulation) is too quick or too slow, the resulting product may exhibit poor quality and may need to be discarded.

Characteristics such as the density, compressibility and acoustic impedance of a fluid may contain important information to indicate the status of fluid processing activity such as a beverage fermentation process or coagulation status. Of particular interest in many applications is the determination of fluid density. Typically, to make a density measurement of a fluid, an accurate volumetric measurement or removal of the fluid is required. However, for rapid or remote monitoring and particularly in dynamic situations, a simplified approach is desired. Furthermore, a system that can constantly measure these fluid characteristics without requiring interruption or fluid removal is desired.

Obtaining a measurement of a density of a fluid has numerous advantages for various industrial applications, one of which is the alcoholic fermentation of beer. The alcoholic fermentation induced by the presence of yeasts is a fundamental step in several biotechnological processes, including the production of beer. Obtaining density measurements of beer is beneficial as an indicator for determining whether the beer is properly fermented. For industrial purposes, the exact prediction of the fluid density during the fermentation process as early as possible would be of great value. This is especially useful during the fermentation of beer, considering the fact that the fermentation binds a huge amount of machine capacities and time. Possessing an appropriate process status predictor, preceding and subsequent steps could be coordinated better to maximize resource utilization and minimize overall costs.

Simple ultrasonic techniques have been already proposed as a method to determine the density of beer during the fermentation process. Ultrasonic methods provide a non-invasive and non-destructive system to monitor the fermentation process. The non-invasive aspect of ultrasonic methods is of particular importance for biotechnological or medical purposes, where hygienic or microbiological safety must be guaranteed. Ultrasonic devices have been developed which are capable of providing some information concerning fluids. For example, devices using ultrasonic signals to determine the fluid level in containers are disclosed in U.S. Pat. Nos. 3,357,246, 4,144,517 and 4,203,324. However, these devices have limited accuracy in certain processes such as fermentation and other biotechnological processes in which the fluid properties are constantly changing and require additional measurements to assist in the determination of fluid characteristics in real-time.

In the cheesemaking process, starter cultures ferment the milk into a thicker substance, which eventually curdles into cheese. As curds form, whey protein separates from the curds. Pressing the curds can expel more whey protein from the curds. As the whey protein is removed, the resulting cheese is more dense than the milk used at the start of the process. During this process, the curds are cut into smaller pieces to facilitate continued drainage of whey from the curds. The timing of curd cutting is important. Cutting curds too early will not provide a clean break, and instead will yield ill-formed curds and a gooey substance around them and wasting proteins that should otherwise be encapsulated in the curds. Cutting curds too late will result in curds with lower-than-desired water content and lower the product yield. Thus, it is important to identify a proper cut time. Current methods rely on fixed calculations that may or may not involve direct human handling and testing of the curd (known as the "Clean Break" method) and do not account for variables that may occur from the use of different cultures, or different environmental conditions such as temperature or humidity, in the process.

Accordingly, there exists a need for an easy-to-deploy, low-maintenance, high-sensitivity sensor device capable of autonomously, quickly and reliably measuring material characteristics in real-time. Moreover, there exists a need for a sensor device that can noninvasively detect the flocculation point of the curding process and resulting optimal cut time for the cheese making process. This document describes a system that solves at least some of the problems described above.

SUMMARY

This document describes systems and methods for monitoring the processing of a dairy product, such as a cheesemaking process, and for identifying certain stages of the process, such as the flocculation point of the curding process and optimum cutting time during the cheesemaking process. The system may include a sonic sensor a memory containing programming instructions that are configured to cause a processing device to perform the methods. The processor will receive, from the sonic sensor, a signal that is indicative of a speed of sound in a material that is being processed in the cheesemaking process. The processor will use the speed of sound to identify a cut point in the cheesemaking process. The processor will generate a signal when the cut point is reached.

To use the speed of sound to identify the cut point, the system may monitor the speed of sound in the material over a period of time as the speed of sound increases. The system may identify the cut point based on a time at which a rate of change of the speed of sound falls below a threshold. For example, the cut point may be the time at which the rate of change falls below the threshold, or it may be a specified amount of time after the rate of change falls below the threshold.

In some embodiments, the system may use the signal to cause a cutting system to move a set of knives within the material to cut curds within the material.

In some embodiments, the system also may use the speed of sound in the material to identify a flocculation point in the cheesemaking process, and it may generate an alert when the flocculation point is reached. Optionally, to identify the flocculation point the system may monitor the speed of sound in the material over a period of time and identify the flocculation based on a time at which a rate of change of the speed of sound increases above a threshold. For example, the flocculation point may be the time at which the rate of change falls below the threshold, or it may be a specified amount of time after the rate of change increases above the threshold. Alternatively, the system may identify the flocculation point by monitoring the speed of sound in the material over a period of time, using the speed of sound to determine a density of the material over the period of time, and identifying the flocculation point as a time at or after a rate of change of the density of the material falls below a threshold. In such embodiments, to determine density of the material the system may use the speed of sound and a bulk modulus of the fluid to determine density of the material.

In some embodiments, the system may cause a display device to output a graphic representation of the determined state of the cheesemaking process. The dynamic representation of determined level or processing activity may include a cheese vat with a dynamically changing cavity. Displayed characteristics of the cavity will change as the determined level of flocculation increases until the optimum cut point is achieved. In addition or alternatively, the dynamic representation of the determined level of processing activity may include a dynamically changing status bar. The system may continue to determine the level of processing activity of the fluid over a period of time. If so, it may access a data set of previous processing activity for the fluid and identify, from the data set, an expected level of processing activity over the period of time.

In some embodiments, the sensor may include a transducer, a processor, and programming instructions that are configured to cause the processor to (i) cause the transducer to generate and transmit signals toward a reflective surface, (ii) monitor signals reflected from the reflective surface when received by the transducer, and (iii) use a time of generation of the generated signals and a time of receipt the received signals to measure the speed of sound in the material.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure are defined at the end of this Detailed Description section.

Figure 1:
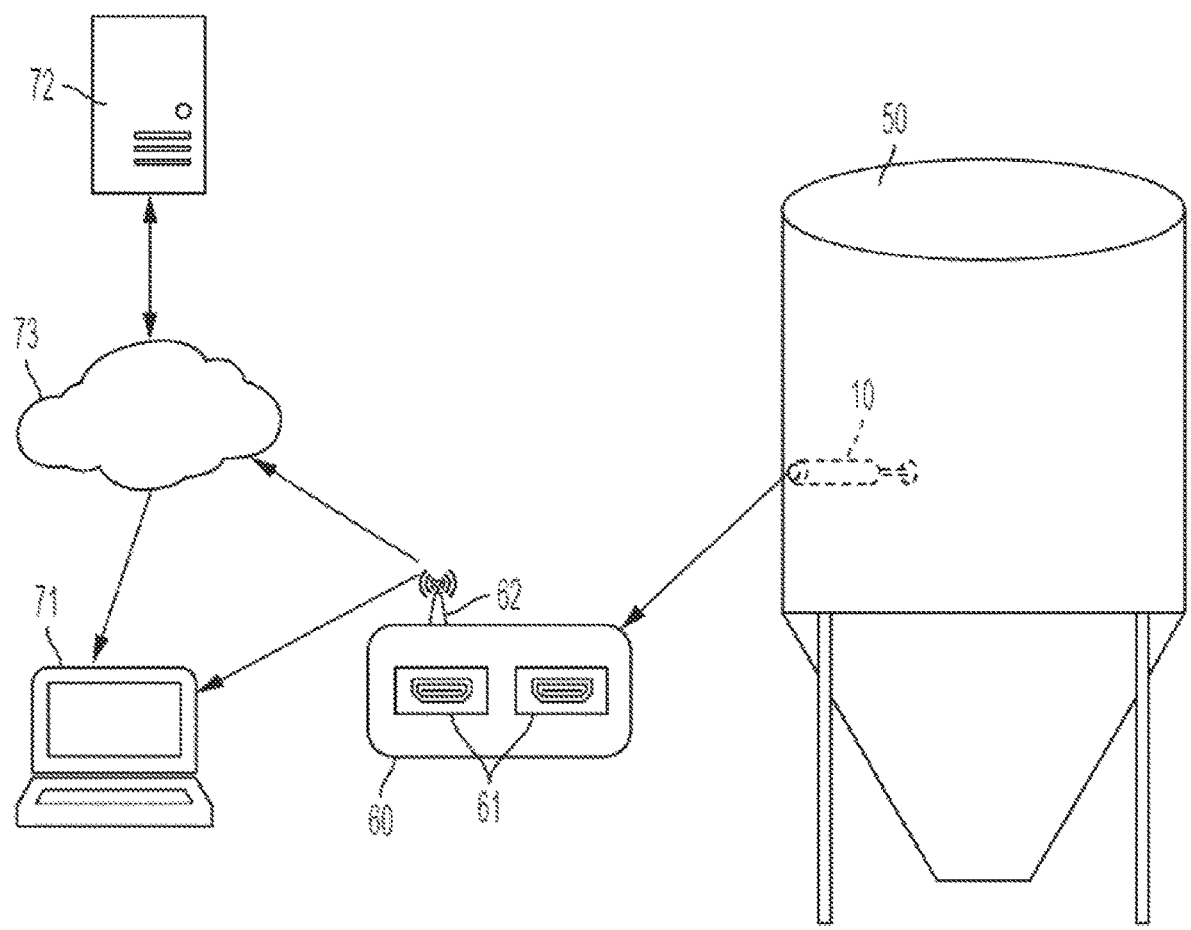
FIG. 1 illustrates elements of an example system for measuring characteristics of material that is being processed.

FIG. 1 illustrates elements of an example system for measuring characteristics of a dairy product or other material that is being processed. The system is used with a material processing container 50, which in this illustration is a fermentation tank such as that used in a beer, cider or other beverage fermentation process. Other processing containers may be used for other material processing activities, such as biological fluid processing systems, chemical manufacturing processes, milk production tanks, vats for processing dairy products such as cheese and yogurt, and vats or for producing other food products such as soups, sauces or meat substitutes, flavoring and/or fragrance production equipment, and natural gas or oil processing systems. The system includes a sonic sensor 10 that can be installed at least partially inside of the container. The sonic sensor 10 may include a fitting that connects to or is outside of the container when the sensor is in place. The fitting may include or be electrically connected to a transmitter that transmits signals to a communication gateway 60, or the fitting may pass a wire that is used to transmit signals to the communication gateway 60. The gateway 60 includes one or more ports 61 or receivers that receive signals from the sonic sensor 10 and: (i) relay the signals via a transmitter 62 to a remote server 72 via a communication network 73; and/or (ii) relay the signals to a local computer 71 via the transmitter 62, either directly or through the communication network 73. The gateway 60 is optional, as the computer 71 may be directly connected to the sonic sensor 10, and if the sonic sensor 10 is equipped with a transmitter then the sonic sensor 10 may transmit signals to the computer 71 and/or remote server 72 either directly or via a communication network 73.

Figure 2:
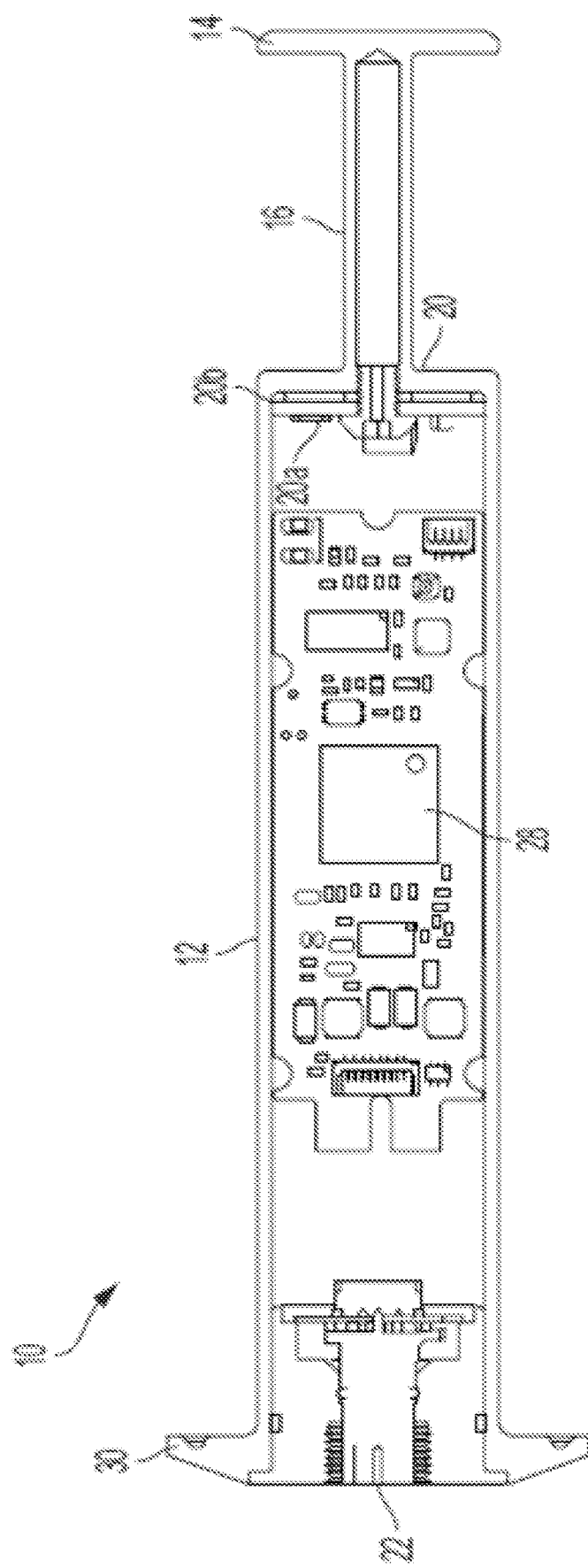
FIG. 2 is a cross-sectional view of elements of a sonic sensor that may be used with the system of FIG. 1.

FIG. 2 illustrates a cut-away view of a sonic sensor 10 in accordance with various embodiments. Sonic sensor 10 includes a probe body 12, which may include a housing having a first end that is connected to a fitting 30. The probe body 12 housing may be cylindrical, or shaped in another form such as a rectangular or conical shape, and formed of any appropriate conductive material providing a hygienic or microbiological safe surface such as American Iron and Steel Institute (AISI) Type 304 or 316 stainless steel. The fitting 30 may be designed to provide a portal via which the probe may be inserted into a processing tank and via which signals captured by the probe may be transmitted out of the tank, either via a wire or via a wireless transmitter. In various embodiments, the fitting 30 may be of a universal sanitary fitting type, such as a Tri-Clamp type fitting having a 1 inch or 1.5 inch outside diameter which may fit into standard openings of fermentation vessels, a DIN fitting for use with dairy production equipment, or another fitting that is suitable for creating a sanitary seal with the container. However, it is to be understood that the fitting 30 is not limited to any particular shape, size or type, and it and may be any appropriate design that can be retrofit and/or provide a new installation into a material processing container. In addition, if the container is configured to hold the sonic sensor 10 so that its reflective pad member 14 floats freely within the fluid, or of a device is available to hold the sonic sensor 10 in such a position, a fitting 30 may not be required.

A second end of the probe body 12 includes transduction surface 26 for signals received from an acoustically reflective pad member 14. The transduction surface 26 may be a closed end cap of the probe body 12, or it may be a member that is positioned proximate to and just inside or outside of the end cap. The transduction surface 26 may be a flat circle, rectangle, oval, square, or other shape. The reflective pad member 14 also may be a flat circle, rectangle, oval, square, or other shape, and it may or may not be the same shape as the transduction surface 26. Optionally, the reflective pad member 14 may have a surface area that is at least as large as that of the transduction surface 26 so that acoustic signals transmitted from the transduction surface 26 will reflect off of the reflective pad member 14. The reflective pad member 14 may be made of a metal such as stainless steel and is connected to the probe body 12 through a stem 16, as the stem 16 includes a first end that is connected to the reflective pad member 14 and a second end that is connected to the transduction surface 26. When the reflective pad member 14, stem 16, and transduction surface 26 are immersed in the material, electric components in the probe body may generate an ultrasonic pulse that will enter the fluid from the transduction surface 26 and reflect back from the pad member 14. These signals can be used to measure the speed of sound through the material. The reflective pad member 14 may include a substantially flat surface that is positioned substantially parallel to the transduction surface 26 and perpendicular to the longest dimension of the stem 16, and thus substantially perpendicular to the direction of propagation of the ultrasonic signal.

The stem 16 connects to the transduction surface 26, which is electrically connected to a transducer 15, such as a piezoelectric transducer, that will convert the ultrasonic signal to an electrical signal. The stem 16 may be a heavily damped connector that includes a metallic housing (such as a stainless steel shell) that is filled with a damping material to reduce noise in the signal that it transfers from the reflective pad member 14 to the transduction surface 26. The damping material may be an epoxy, rubber, cork, or other material that provides damping to the metallic housing. The stem 16 may thus serve as a vibroacoustically absorptive connector.

Optionally, in some embodiments the vibroacoustically absorptive stem 16 may be omitted if the reflective pad member 14 is positioned and secured within the fluid, held in place by a support structure. If so, the reflective pad member 14 will be positioned at a known distance from the transduction surface 26, and also so that the surface of the reflective pad member 14 is parallel to the transduction surface 26.

Optionally, the probe body 12, stem 16 and reflective pad member 14 may be formed of a single piece of metal, machined to create a relatively narrow bore inside of the stem 16 and a relatively larger bore inside of the probe body 12. This manufacturing process, if used, will not require any welds or other connective structures to join the probe body 12, stem 16 and reflective pad member 14.

The transduction surface 26 also may be electrically connected to a temperature sensor 17 so that the temperature sensor 17 can detect the temperature of the transduction surface 26, which will be substantially the same as the temperature of the interconnected stem 16 and pad member 14, and thus indicative of the temperature of the material that contacts the stem 16 and pad member 14. The temperature sensor 17 and transducer 15 may be positioned on one or more circuit boards 20 adhered to or proximate to the transduction surface 26.

The outputs of the temperature sensor 17 and transducer 15 are electrically connected to an onboard processor 28. The processor 28 may be a microprocessor that will execute programming instructions stored on a memory 29, or it may be an element of a microcontroller that includes a memory with programming instructions. The processor 28 will receive the signals from the temperature sensor 17 and transducer 15 and use those signals to determine various properties of the material, such as density, specific gravity, stiffness, compressibility, or other characteristics.

When executing the programming instructions, the processor will cause the transducer 15 to generate a set of pulses that will travel from the transduction surface 26 through the surrounding material to the reflective pad member 14. The transducer 15 will be acoustically connected to the transduction surface 26, either through direct connection or one or more intermediate structures, so that sonic pulses output by the transducer 15 will travel through the transduction surface 26. The stem 16 will have a known length that the processor will use to measure the time is takes for each ultrasonic pulse to leave the transduction surface 26 and return after reflecting off the reflective pad 14. The system can use this "time-of-flight" of the ultrasonic pulse to determine the ultrasonic sound speed, which it may use as a proxy to determine one or more characteristics of the material that is in contact with the reflective pad 14.

By way of example, the density ($\rho$) of a material at any given point of time t is related to the ultrasonic sound speed (c) and the compressibility of the material as represented by a bulk modulus ($\beta$) according to the following equation:

$$c = \sqrt{\frac{\beta}{\rho}}$$

The bulk modulus ($\beta$) represents stiffness and/or compressibility of the material. If the system receives a bulk modulus ($\beta$) as input or stores a value of the bulk modulus ($\beta$) represents, the system may use that data point this equation to determine the material's density ($\rho$) at any point in time (t) based on the ultrasonic sound speed (c) at that time t. (In time-variable applications, density and sound speed may be represented as $\rho_t$ and $c_t$, respectively.) In such applications, the sonic sensor 10 may be considered to be a sonic density sensor.

The processor may transfer the measured data via a communication port 22 to an external processor (such as that of the computer 71 in FIG. 1) for supplemental processing and data visualization. The communication port 22 shown is a High-Definition Multimedia Interface (HDMI) port, but any connection for communicating measurements to an outboard analysis unit may be used.

In some alternative embodiments, instead of determining the material's characteristics onboard the sonic sensor 10, the sonic sensor 10 may simply transfer the data received from the temperature sensor 17 and transducer 15 to an off-board computing device to perform the fluid characteristic determination outside of the sensor 10.

Figure 3:
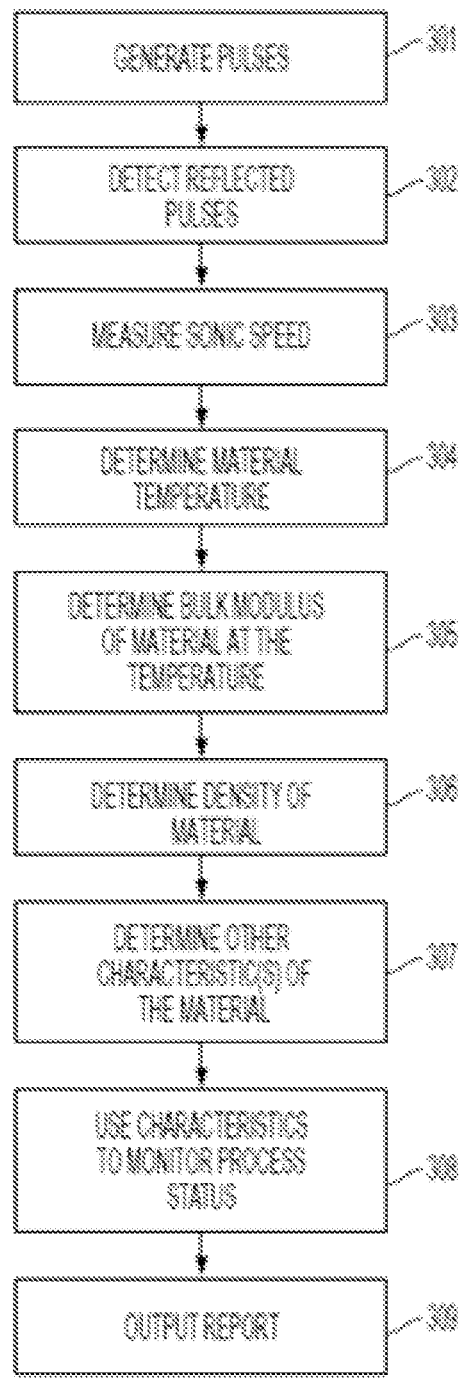
FIG. 3 is a flowchart illustrating an example process of determining material characteristics using a sonic sensor such as that of FIG. 2.

FIG. 3 illustrates an example method of determining characteristics of a material while the material is being processed, such as may be used in dairy processing such as cheesemaking and yogurt making, as well as in brewing beer, cider, wine, rice wine (such as sake), mead, kombucha, root beer or ginger beer. A system such as that described above will use a sonic sensor such as that described in FIG. 2 to generate sonic pulses (at 301) and transmit the pulses to a reflective pad member that is placed in the material. The sensor will then detect reflected pulses (at 302) and determine the sound speed within the material (at 303). The speed of sound may simply be determined be a process such as (i) determining the time of travel of each pulse, as measured from the time of generation to the time at which the transducer receives the reflected pulse, and (ii) dividing the time of travel by the distance of travel (which is twice the length of the stem, which is also the distance between the reflective pad and the transduction surface). In practice this equation may be modified by a factor that is a function of the type of material being processed, stem thickness, temperature or other variables.

At 306 the system may then use the determined speed of sound ($c_t$) at any point in time t to determine a density ($\rho_t$) of the material at time t. The system may do this using the equation described above, using a bulk modulus ($\beta$) in which:

$$\rho_t = \frac{\beta}{c_t^2}$$

The system will need to identify the bulk modulus ($\beta$) at 305 before completing this calculation. The system may receive the bulk modulus as a user input via the user interface, or it may store the bulk modulus as a characteristic of the material in a data set. In general, the bulk modulus ($\beta$) of a material is a thermodynamic property that may vary by temperature, and thus the system also may need to identify the temperature of the material (as detected by the temperature sensor) at 304 before determining the particular bulk modulus for the temperature. Once the system receives the temperature (at 304) and an identification of the material, it may determine the bulk modulus (at 305) by a suitable calculation, or by retrieving the bulk modulus from a data set stored in memory. When used in a cheesemaking process, the system may use this calculation to monitor the process before the milk starts to curdle and/or while the milk is curdling.

At 307 the system may then use the density to determine one or more other characteristics of the material. For example, the specific gravity of a substance is a ratio of the density of the substance to the density of a reference substance, such as water (which has a density of 1 gram/cubic centimeter). The system may thus use the density to determine the material's specific gravity.

At 308 the system may use the determined characteristics to assess and/or monitor the progress of the process and determine when the process is complete, or has moved from a first phase into a second phase. For example, in fermentation and distillation processes, specific gravity can be used to monitor the process of the fermentation or distillation. When a target specific gravity is achieved, or when a rate of change of the specific gravity decreases and the specific gravity remains relatively constant (i.e., below a threshold standard deviation) for a threshold period of time, the process may be considered to be complete. For example, when brewing beer, the process may be considered to be complete when the specific gravity has dropped by 70 or 75% of its original level, or when the specific gravity remains substantially constant for a period of three days.

Other levels and time frames may be used depending on the process and desired result. In cheese and yogurt-making processes, the system may look for the density to stop changing in any significant amount over a period of time. This may signal that the material has reached a flocculation point, at which time the curd mass has formed. For example, the system may monitor the slope of a curve of density measured over time, and it may identify when the slope is below a threshold amount. At this point, the density of the material will have become relatively constant, and the process will have reached a flocculation point or otherwise moved into a second phase.

At 309 the system may output any of the measured parameters (such as temperature or speed of sound), calculated characteristics (such as density or specific gravity), or indication of progress of the process (such as fermentation activity or an indication of whether the material has reached a flocculation point). The output may occur by an electronic message, via an audio output, or via a user interface. Examples of user interfaces will be discussed below in the context of FIG. 4.

This document also illustrates an example method of determining characteristics of a material after the material moves into a second phase of processing, such as after the flocculation point when the curd mass has formed in a cheesemaking process. In cheesemaking, the system may be used in this stage to identify an optimal cut time, which is a time at which the curds should be cut into smaller pieces. As noted in the background section of this application, identifying an appropriate cut time is important in cheesemaking. In the prior art, most manufacturers simply calculate cut time as a multiple of the time that the process took to reach the flocculation point. Cutting curds too early will not provide a clean break, and instead will yield ill-formed curds and a gooey substance around them. Cutting curds too late will result in curds with lower-than-desired water content, reducing the product yield.

During this phase, the system may use the sonic sensor to generate sonic pulses (at 311) and transmit the pulses to a reflective pad member that is placed on or in the coagulating material. The sensor will then detect reflected pulses and determine the sound speed within the material. As with the process of FIG. 3, the speed of sound may be determined by a process such as (i) determining the time of travel of each pulse, as measured from the time of generation to the time at which the transducer receives the reflected pulse, and (ii) dividing the time of travel by the distance of travel (which is twice the length of the stem, which is also the distance between the reflective pad and the transduction surface). In practice this equation may be modified by a factor that is a function of the type of material being processed, stem thickness, temperature or other variables.

In this stage the density of the material will remain relatively constant, and the system may then determine the density of the material to be, for example, the value identified in step 309 of FIG. 3, or a known reference density. The system may then use the determined speed of sound ($c_t$) at any point in time t and the density ($\rho$) of the material as identified above to identify the bulk modulus ($\beta_t$) of the material at that point in time, such as by the following equation:

$$\beta_t = \rho * c_t^2$$

Once the system determines the bulk modulus, it may use this data point to determine one or more other characteristics of the material, such as stiffness of the curds. The system may convert bulk modulus to stiffness with reference to a stress-strain curve, or by applying a calculation such as by adjusting the bulk modulus by a factor that corresponds to the temperature of the material (as determined by a temperature sensor).

The system may use the determined characteristics to assess and/or monitor the progress of the process and determine when the process has reached a cut point. For example, the system may continue to monitor the speed of sound, and a rate of change of the speed of sound decreases and the speed of sound is relatively constant (i.e., below a threshold standard deviation) for a threshold period of time, the process may be considered to have reached the cut point. At this point, the system will generate and output an alert or other signal indicating that the cut point has been reached and the curds should be cut. Optionally, the signal may be directed to a cutting system of the cheesemaking equipment, wherein the cutting system will include a set of knives and a motor or other device that will cause the set of knives to move within the material in response to receiving the signal.

The process above is illustrated by results of an example case study in which the speed of sound within a dairy product is measured over time as it is processed into cheese. The speed of sound remains relatively constant until the flocculation point, at which point the milk begins to coagulate and separate into curds and whey. After flocculation point, the speed of sound gradually increases until it reaches a level at which the rate of change in the speed of sound is less than a threshold amount. When level is reached, the system may generate the alert indicating that it is time to cut the curds.

The methods described above may be used in other fluid processing activities in which measurements such as that of the fluid's specific gravity or density are useful to monitor progress of the process. Examples of such other processes include alcoholic beverage distillation, hydrocarbon product processing (such as crude oil and petroleum products, in which the system may determine API gravity), ingestible probiotic production and the manufacture of pharmaceuticals. In some such processes, the fluid's density may remain constant but other variables (such as stiffness) of the fluid may change. The system may look for changes in the values of those variables and use those changes (in view of the equations above) as indicia of a level of processing activity (or at least a change in condition) of the material.

Figure 4:
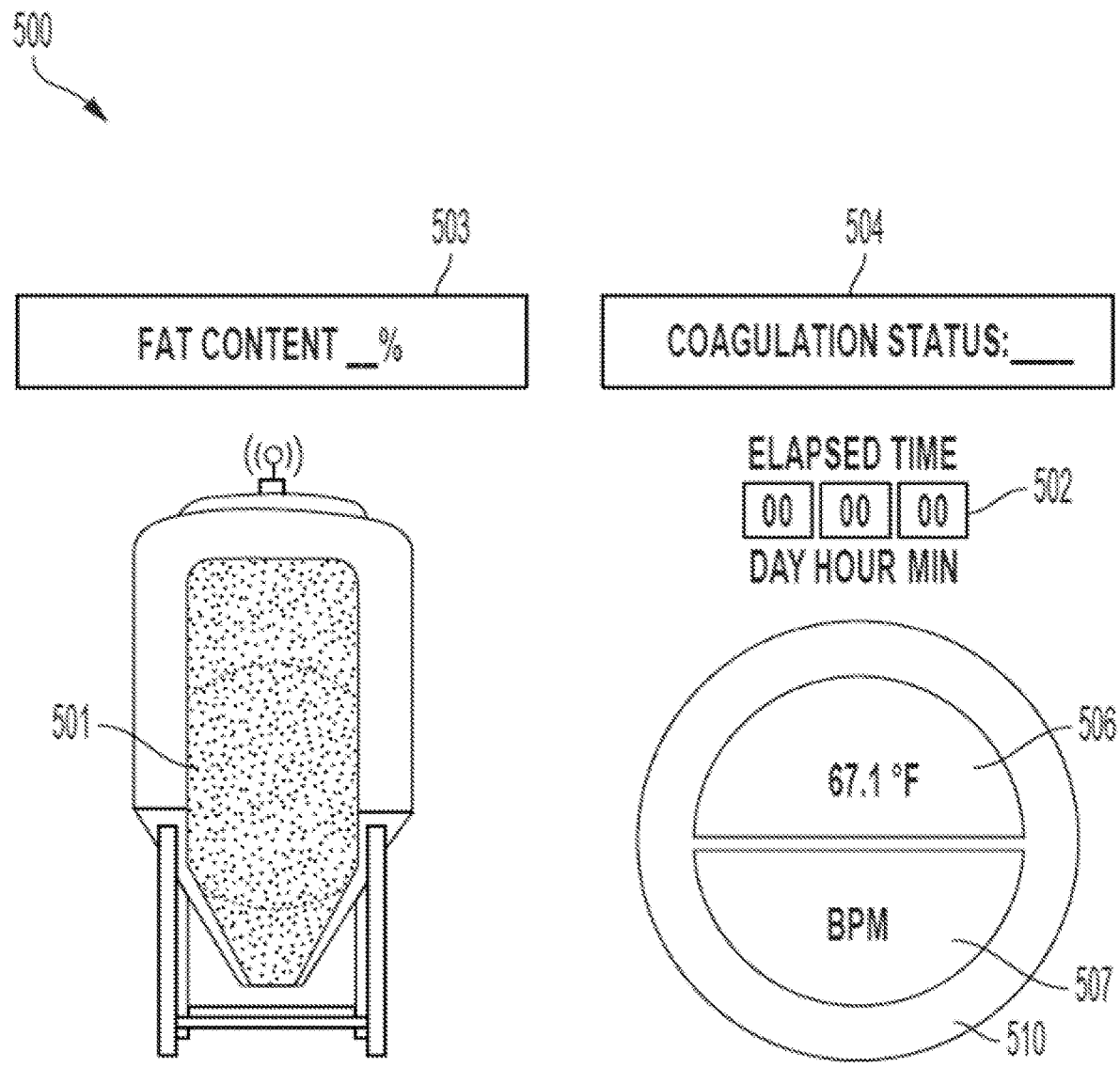
FIG. 4 illustrates elements of a user interface for displaying progress of cheesemaking or other processing of a material.

FIG. 4 illustrates an example user interface 500 for monitoring processing of a fluid, such as converting milk and a culture into cheese, which is shown in this example. The user interface presents information received from the sonic sensor and/or determined by a processor, and it also include a dynamic representation of the determined level of fermentation (or other process progress). In this case the dynamic representation includes a visual representation of a cheese vat 501 with a dynamically changing cavity. Displayed characteristics of the cavity will change as the determined level of flocculation increases until the optimum cut point is achieved. The user interface's dynamic representation also may include a status bar 510 that is shown by way of example in the form of a circle.

The user interface also includes a dynamically changing time field 502 that indicates either (a) how much time has elapsed in the process, or (b) how much time is expected to remain in the process. If expected time remaining is used, the system may determine this by subtracting elapsed time from an expected time that is stored in a memory based on previous processing times for batches of the same or a similar product. Optionally, the system may dynamically adjust the expected time to remain if processing parameters indicate that at one or more points in time the fluid coagulation process is more than a threshold level above or below an expected value or range based on target data from previous batches as stored in memory.

The user interface also may display characteristics of the material being processed such as percent fat content 503 as measured at a reference time at or near the beginning of the process, the current coagulation status 504 as measured in real time, the temperature 506 of the product and other measurements or calculated parameters 507. The user interface may continue to display such characteristics as the ingredients assume another form, such as turning from a liquid to a colloid or a solid in a yogurt or cheese production process.

Before the process starts, FIG. 4 illustrates the vat 501 with an empty cavity, and the status bar 510 contains no shading. The original percent fat content 503 has not yet been determined, and no time 502 has elapsed.

Figure 5:
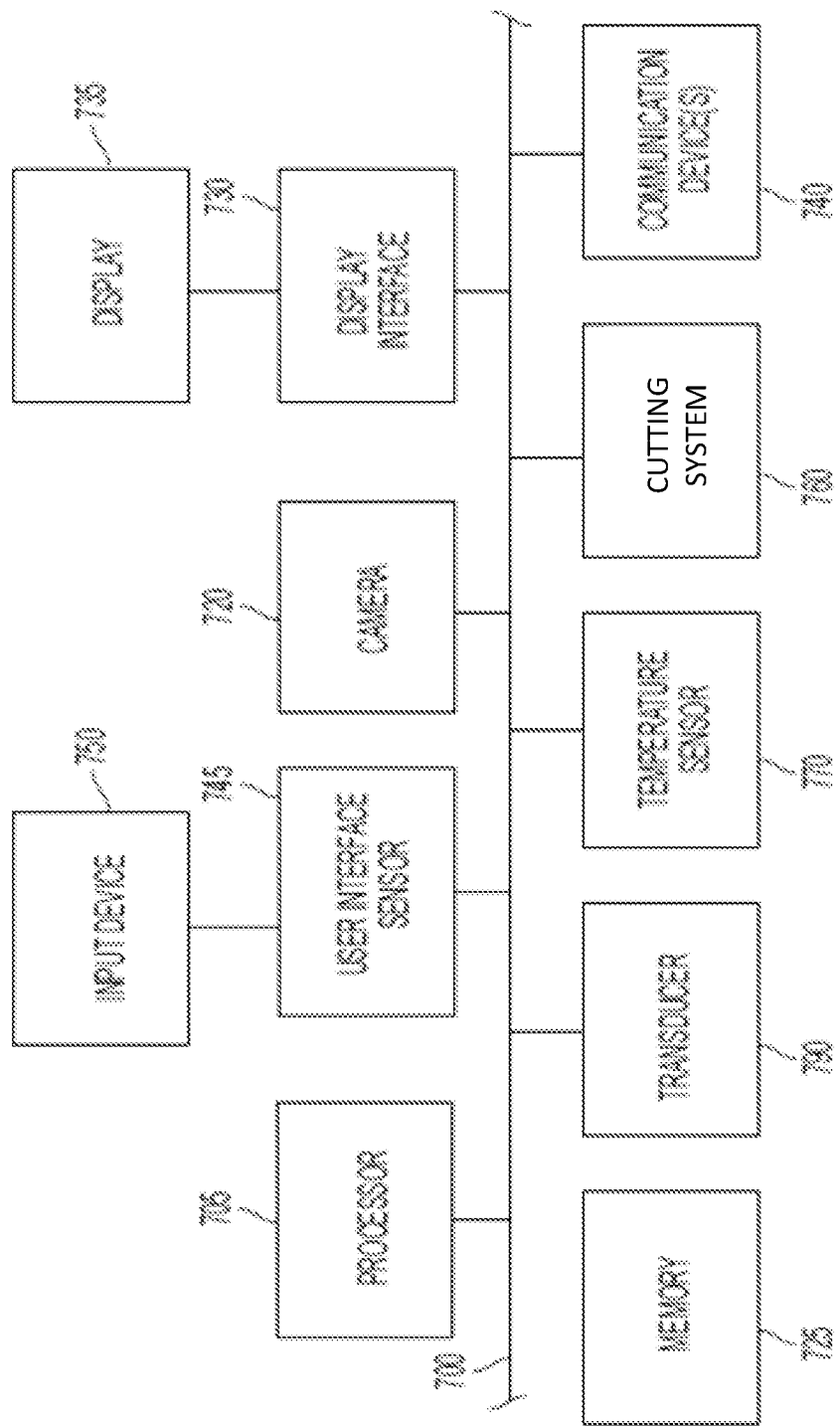
FIG. 5 illustrates example electronic components that may be used in various aspects.

FIG. 5 depicts an example of internal hardware that may be included in any of the electronic and/or mechanical components of the system, such as the onboard hardware of the sonic sensor 10 of FIG. 2, or that of the computing device 72 or server 72 of FIG. 1. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored.

An optional display interface 730 may permit information from the bus 700 to be displayed on a display device 735 in visual, graphic or alphanumeric format. An audio interface and audio output (such as a speaker) also may be provided. Communication with external devices may occur using various communication devices 740 such as a wireless antenna, an RFID tag and/or short-range or near-field communication transceiver, each of which may optionally communicatively connect with other components of the device via one or more communication system. The communication device 740 may be configured to be communicatively connected to a communications network, such as the Internet, a local area network or a cellular telephone data network.

The hardware may also include a user interface sensor 745 that allows for receipt of data from input devices 750 such as a keyboard, a mouse, a joystick, a touchscreen, a touch pad, a remote control, a pointing device and/or microphone. Digital image frames also may be received from a camera 720 that can capture video and/or still images. The system also may include a cutting system 760 including one or more knives and a motor as described above. Various elements of the system (as installed in the sonic sensor) also may include a temperature sensor 770 and a transducer 790, as previously described in the context of FIG. 2 above.

In this document, the terms "electronic device," "computer" and "computing device" refer to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device containing programming instructions that are configured to cause a processor to perform certain defined steps, such as the steps of this patent document's monitoring processes described above.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link.

"Electronic communication" refers to the transmission of data via one or more signals between two or more electronic devices, whether through a wired or wireless network, and whether directly or indirectly via one or more intermediary devices. Devices are "electronically connected" if a path for transmission of electronic signals exists between the two devices.

In this document, the term "connected," when referring to two physical structures and not used in the context of electronic or communicative connection, means that the two physical structures touch each other. Devices that are connected may be secured to each other, or they may simply touch each other and not be secured.

In this document, the term "fluid" has its common meaning as any substance that has no fixed shape and yields easily to external pressure. A fluid may be a liquid, a gas or a plasma. In addition, a fluid may contain some solids so long as the overall substance will flow in response to the application of force.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for monitoring a cheesemaking process, the system comprising:
   a sonic sensor; and
   a memory containing programming instructions that are configured to cause a processing device to:
      receive, from the sonic sensor, a signal that is indicative of a speed of sound in a material that is being processed in the cheesemaking process,
      use the speed of sound to identify a cut point in the cheesemaking process, and
      generate a signal when the cut point is reached.

2. The system of claim 1, wherein the programming instructions that are configured to cause the processor to use the speed of sound to identify the cut point comprise instructions to:
   monitor the speed of sound in the material over a period of time as the speed of sound increases; and
   identifying the cut point based on a time at which a rate of change of the speed of sound falls below a threshold.

3. The system of claim 1, further comprising using the signal to cause a cutting system to move a set of knives within the material to cut curds within the material.

4. The system of claim 1, wherein the programming instructions further comprise instructions to:
   use the speed of sound in the material to identify a flocculation point in the cheesemaking process; and
   generate an alert when the flocculation point is reached.

5. The system of claim 4, wherein the programming instructions that are configured to cause the processor to use the speed of sound to identify the flocculation point comprise instructions to:
   monitor the speed of sound in the material over a period of time; and identify the flocculation point based on a time at which a rate of change of the speed of sound increases above a threshold.

6. The system of claim 4, wherein the programming instructions that are configured to cause the processor to use the speed of sound to identify the flocculation point comprise instructions to:
monitor the speed of sound in the material over a period of time;
use the speed of sound to determine a density of the material over the period of time; and
identify the flocculation point based on a time at which a rate of change of the density of the material falls below a threshold.

7. The system of claim 6, wherein the instructions to use the speed of sound to determine density of the material comprise instructions to use the speed of sound and a bulk modulus of the fluid to determine density of the material.

8. The system of claim 1, wherein the system may cause a display device to output a graphic representation of a determined state of the cheesemaking process.

9. The system of claim 1, wherein:
the sensor comprises a transducer, a processor, and programming instructions that are configured to cause the processor to:
cause the transducer to generate and transmit signals toward a reflective surface,
monitor signals reflected from the reflective surface when received by the transducer, and
use a time of generation of the generated signals and a time of receipt the received signals to measure the speed of sound in the material.

10. A method for monitoring a cheesemaking process, the method comprising, by a processor:
receiving, from a sonic sensor, a signal that is indicative of a speed of sound in a material that is being processed in the cheesemaking process;
using the speed of sound to identify a cut point in the cheesemaking process; and
generating a signal when the cut point is reached.

11. The method of claim 10, wherein using the speed of sound to identify the cut point comprises:
monitoring the speed of sound in the material over a period of time as the speed of sound increases; and
identifying the cut point based on a time at which a rate of change of the speed of sound falls below a threshold.

12. The method of claim 10, further comprising using the signal to cause a cutting system to move a set of knives within the material to cut curds within the material.

13. The method of claim 10, further comprising:
using the speed of sound in the material to identify a flocculation point in the cheesemaking process; and
generating an alert when the flocculation point is reached.

14. The method of claim 13, wherein using the speed of sound to identify the flocculation point comprises:
monitoring the speed of sound in the material over a period of time; and
identifying the flocculation point based on a time at which a rate of change of the speed of sound increases above a threshold.

15. The method of claim 13, wherein using the speed of sound to identify the flocculation point comprises:
monitoring the speed of sound in the material over a period of time;
using the speed of sound to determine a density of the material over the period of time; and
identifying the flocculation point based on a time at which a rate of change of the density of the material falls below a threshold.

16. The method of claim 15, wherein using the speed of sound to determine density of the material comprises using the speed of sound and a bulk modulus of the fluid to determine density of the material.

17. The method of claim 10, further comprising causing a display device to output a graphic representation of a determined state of the cheesemaking process.

18. The method of claim 10, wherein the method further includes:
by a transducer of the sensor, generating and transmitting signals toward a reflective surface; and
by the processor:
monitoring signals reflected from the reflective surface when received by the transducer, and
using a time of generation of the generated signals and a time of receipt the received signals to measure the speed of sound in the material.

19. A computer program product, comprising a memory that stores programming instructions that are configured to cause a processor to:
receive, from a sonic sensor, a signal that is indicative of a speed of sound in a material that is being processed in a cheesemaking process;
use the speed of sound to identify a cut point in the cheesemaking process; and
generate a signal when the cut point is reached.

20. The computer program product of claim 19, wherein using the speed of sound to identify the cut point comprise instructions to:
monitoring the speed of sound in the material over a period of time as the speed of sound increases; and
identifying the cut point based on a time at which a rate of change of the speed of sound falls below a threshold.

* * * * *